United States Patent [19]

Bergeron et al.

[11] Patent Number: 5,064,335
[45] Date of Patent: Nov. 12, 1991

[54] APPARATUS FOR HANDLING CARGO

[75] Inventors: Ghislain J. Bergeron; Bernard Bergeron, both of Alberta, Canada

[73] Assignee: Denis Tardif, Alberta, Canada; a part interest

[21] Appl. No.: 507,135

[22] Filed: Apr. 3, 1990

[30] Foreign Application Priority Data

Jun. 14, 1989 [CA] Canada ............................ 602718

[51] Int. Cl.$^5$ ............................................. B60P 1/00
[52] U.S. Cl. ............................ 414/522; 211/151; 224/42.44; 296/26
[58] Field of Search .................. 414/522, 537, 538; 296/26; 224/42.44, 310, 281; 211/151

[56] References Cited

U.S. PATENT DOCUMENTS

| 2,490,014 | 12/1949 | Brand | 224/42.44 X |
|---|---|---|---|
| 3,058,636 | 10/1962 | Bilbeisi | 224/42.44 X |
| 3,352,440 | 11/1967 | Wilson | 414/537 |
| 3,480,166 | 11/1969 | Abbott | 414/462 |
| 3,768,673 | 10/1973 | Nydam et al. | 414/522 |
| 3,927,779 | 12/1975 | Johnson | 414/462 |
| 4,081,095 | 3/1978 | Wilburn et al. | 414/522 X |
| 4,139,236 | 2/1979 | Hill | 298/14 |
| 4,225,280 | 9/1980 | Brunet et al. | 414/479 |
| 4,278,387 | 7/1981 | Seguela et al. | 414/462 |
| 4,685,857 | 8/1987 | Goeser et al. | 414/522 |
| 4,824,158 | 4/1989 | Peters et al. | 414/522 X |
| 4,900,217 | 2/1990 | Nelson | 296/26 X |
| 4,950,123 | 8/1990 | Brockhaus | 414/522 |

FOREIGN PATENT DOCUMENTS

| 437448 | 7/1973 | Australia . |
|---|---|---|
| 855553 | 11/1970 | Canada . |
| 2303972 | 9/1974 | Fed. Rep. of Germany . |

Primary Examiner—David A. Bucci
Attorney, Agent, or Firm—Beveridge, DeGrandi & Weilacher

[57] ABSTRACT

An apparatus for handling cargo consisting of a pair of elongate supports. The supports are secured in parallel spaced relation to a cargo box of a delivery vehicle. A rectangular platform is provided having longitudinal edges which engage the supports. The platform is movable between a position extending from the supports and a position retracted within the supports. Movement of the platform is limited in the extended position to preclude the separation of the platform from the supports.

6 Claims, 5 Drawing Sheets

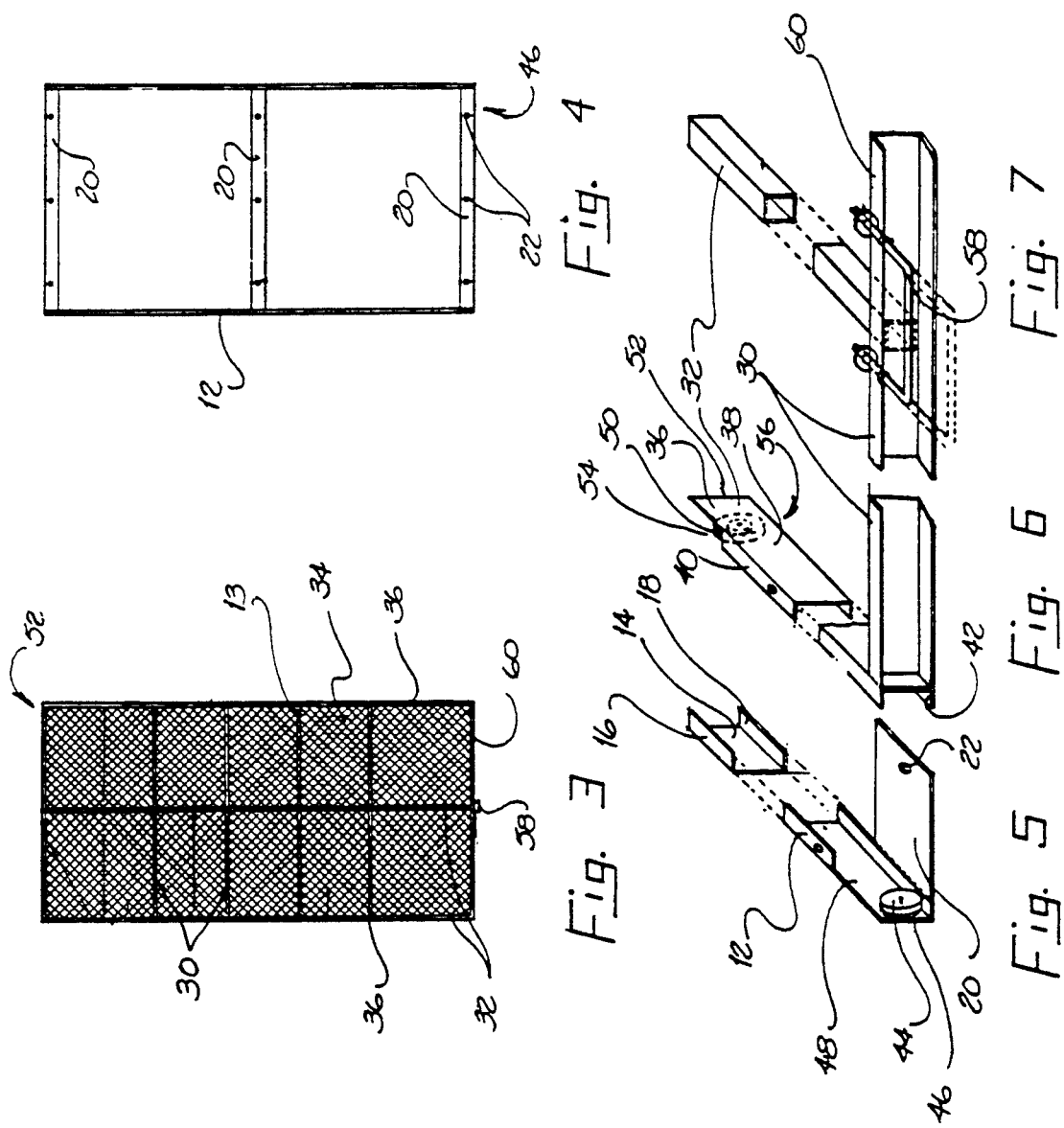

APPARATUS FOR HANDLING CARGO

The present invention relates to an apparatus for handling cargo in delivery vehicles.

BACKGROUND OF THE INVENTION

Most delivery vehicles have a cargo box which is covered in order to protect the cargo against loss due to theft or exposure to weather. The cover over the cargo box is not always of sufficient height to permit a man to stand. For example, half ton trucks equipped with low covers commonly called "shells" are often used as delivery vehicles. This means that the delivery man must risk injury to himself by carrying cargo while bent over, or risk damage to the cargo by dragging it across the cargo box.

SUMMARY OF THE INVENTION

What is required is an apparatus for handling cargo in delivery vehicles which will eliminate or mitigate the problems present in the art.

According to the present invention there is provided an apparatus for handling cargo which is comprised of a pair of elongate supports. Means is provided for securing the supports horizontally in parallel spaced relation to a cargo box of a delivery vehicle. A rectangular platform having longitudinal edges engages the supports thereby coupling the platform to the supports such that the platform is movable between a position extending from the supports and a position retracted within the supports. Means is provided for limiting the movement of the platform in the extended position thereby preventing the separation of the platform from the supports.

The described cargo handling apparatus mitigates problems present in the art as it permits the delivery man to extend the platform to bring the cargo within his reach. The supports may be secured to the cargo box in a number of ways, however it is preferred to have the supports attached to mounting plates having holes, such that fasteners may be extended through the holes to secure the supports to the cargo box. The engagement between the platform and the supports may be accomplished in a variety of ways, however it is preferred to use supports of channel iron "C" shaped in cross-section, and have the longitudinal edges of the platform of channel iron "C" shaped in cross-section.

Although beneficial results may be obtained through the use of the cargo handling apparatus described, even more beneficial results may be obtained if modifications are made to the engagement between the platform and the supports to facilitate movement of the platform between the extended and retracted positions when heavily loaded. This can be accomplished by the "C" channel having a side wall, an upper wall and a lower wall. The platform having a first end which is telescopically received in the supports and a second end. Rollers being rotatably secured to the side wall of the "C" channel along the longitudinal edges at the first end of the platform. A space being provided in the upper walls of the "C" channel adjacent the rollers such that the rollers bear against the upper walls of the "C" channel supports. The supports having a first end which receive the platform and a second end. Rollers being rotatably secured to the side wall at the first end of the supports. A space being provided in the upper walls adjacent the rollers such that the rollers bear against the upper walls of the edges of the platform. A space being provided in the lower end wall of the edges of the platform whereby upon coupling the platform and the supports the rollers of the supports may be inserted through the space.

Although beneficial results may be obtained through the use of the invention as described, even more beneficial results may be obtained if means are provided to prevent the separation of the platform from the supports. According to this aspect of the invention there is provided a tongue extending substantially horizontally from the side wall of the platform adjacent the rollers. Upon movement of the platform to an extended position the tongue engages the lower portion of the rollers on the support. By raising the second end of the platform the rollers of the support pass over the tongue to permit disengagement of the platform from the supports.

Although beneficial results may be obtained through the use of the invention as described, even more beneficial results may be obtained if means are provided to lock the platform in position to prevent an unintended retraction of the platform. According to this aspect of the invention the upper wall of the supports, and the upper wall of the edges of the platform have a plurality of holes. The holes in the platform and supports are aligned and a pin inserted therethrough to lock the platform in a preselected position in relation to the supports.

BRIEF DESCRIPTION OF THE DRAWINGS

These and other features of the invention will become more apparent from the following description in which reference is made to the appended drawings, wherein:

FIG. 3 is a top plan view of the platform component of the invention illustrated in FIG. 1.

FIG. 4 is a top plan view of the frame component of the invention illustrated in FIG. 1.

FIG. 5 is a detailed view of the frame component of the invention illustrated in FIG. 4.

FIG. 6 is a detailed view of the platform component of the invention illustrated in FIG. 3.

FIG. 7 is a detailed view of the handle component of the invention illustrated in FIG. 3.

DETAILED DESCRIPTION OF THE PREFERRED EMBODIMENT

Figure 1:
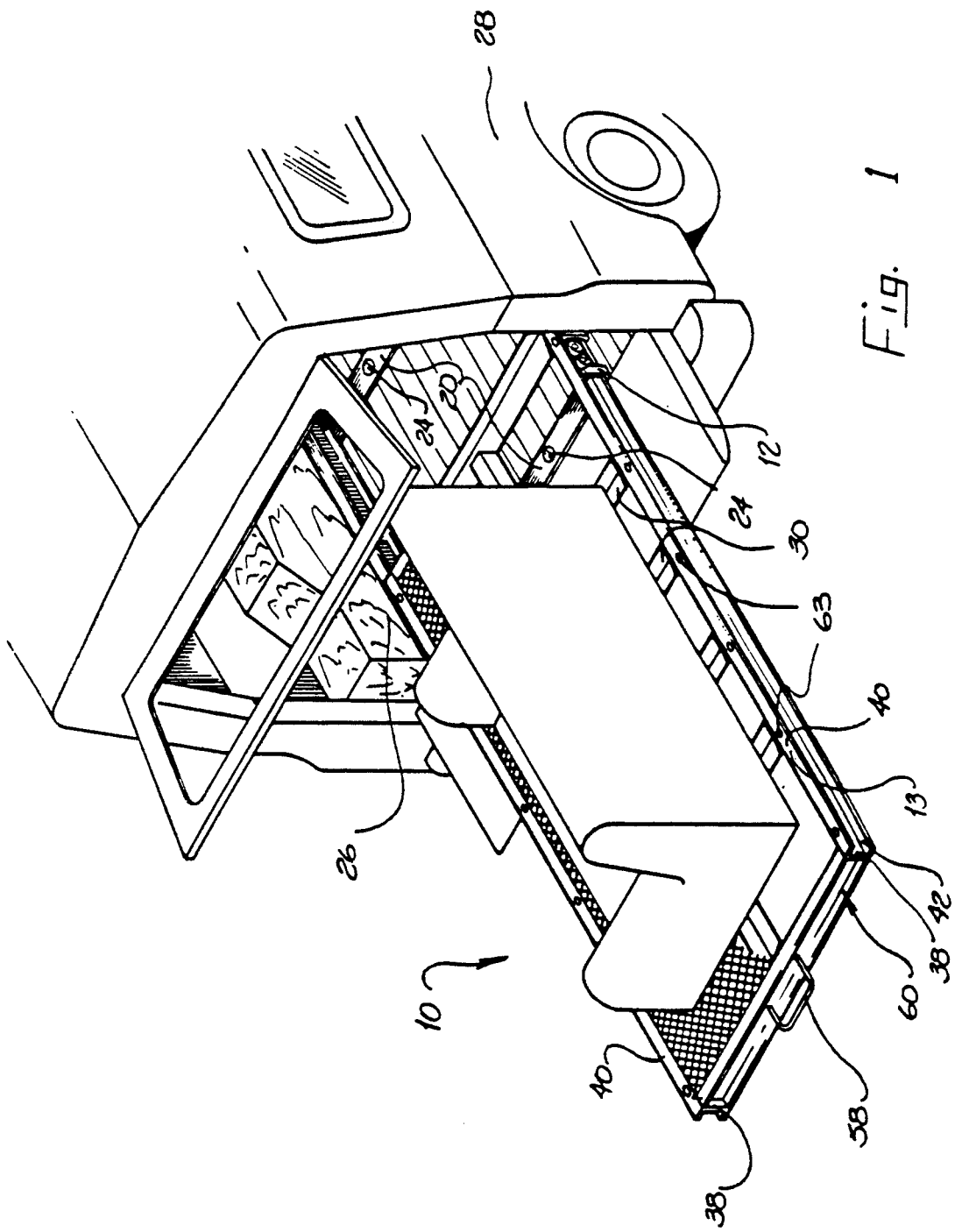
FIG. 1 is a perspective view of a preferred embodiment of the invention in an extended position.

The preferred embodiment will now be described with reference to FIGS. 1 through 9. The preferred embodiment, generally designated by reference numeral 10, is an apparatus for handling cargo.

Figure 8:
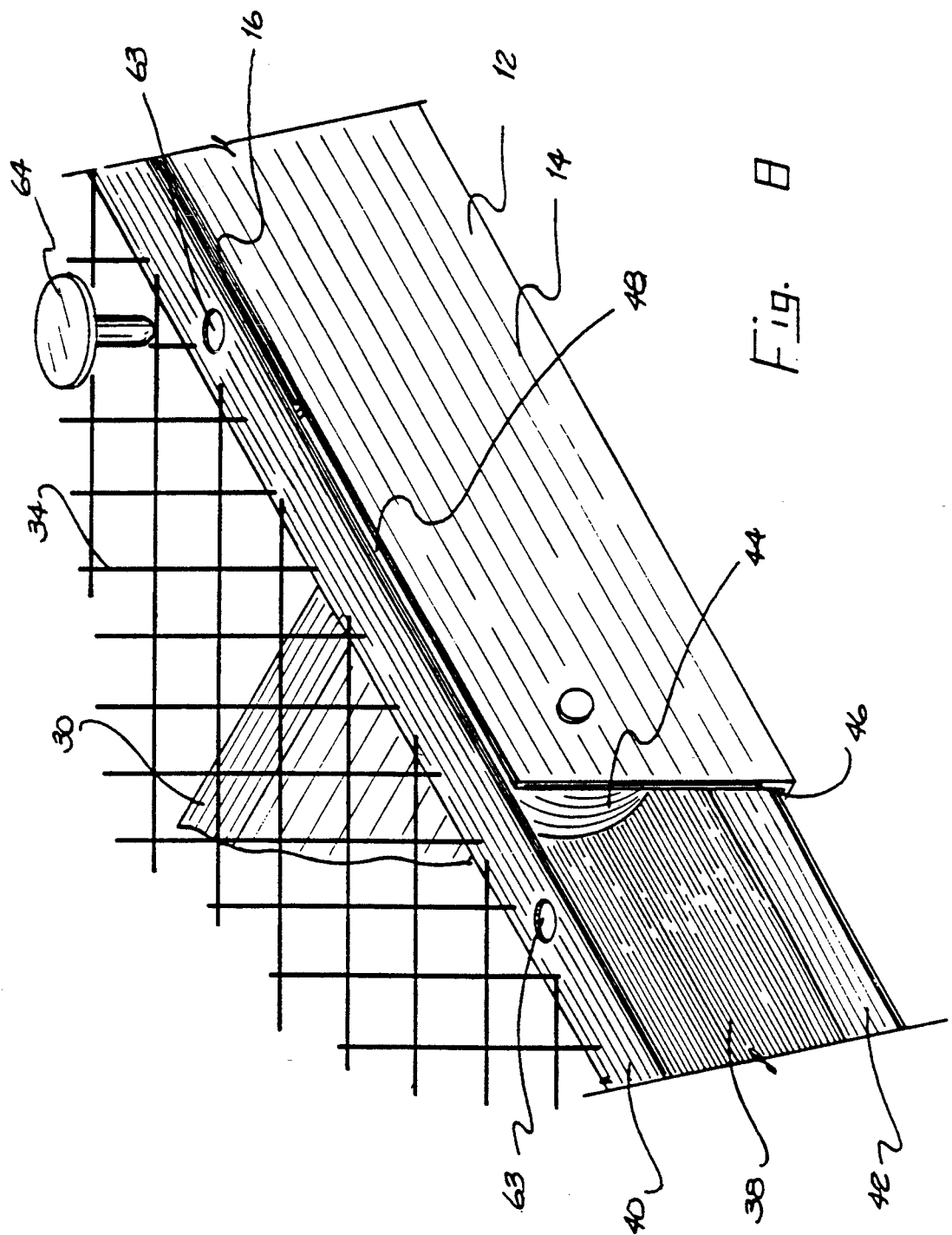
FIG. 8 is a detailed view of the platform of FIG. 3 and frame of FIG. 4.
Figure 9:
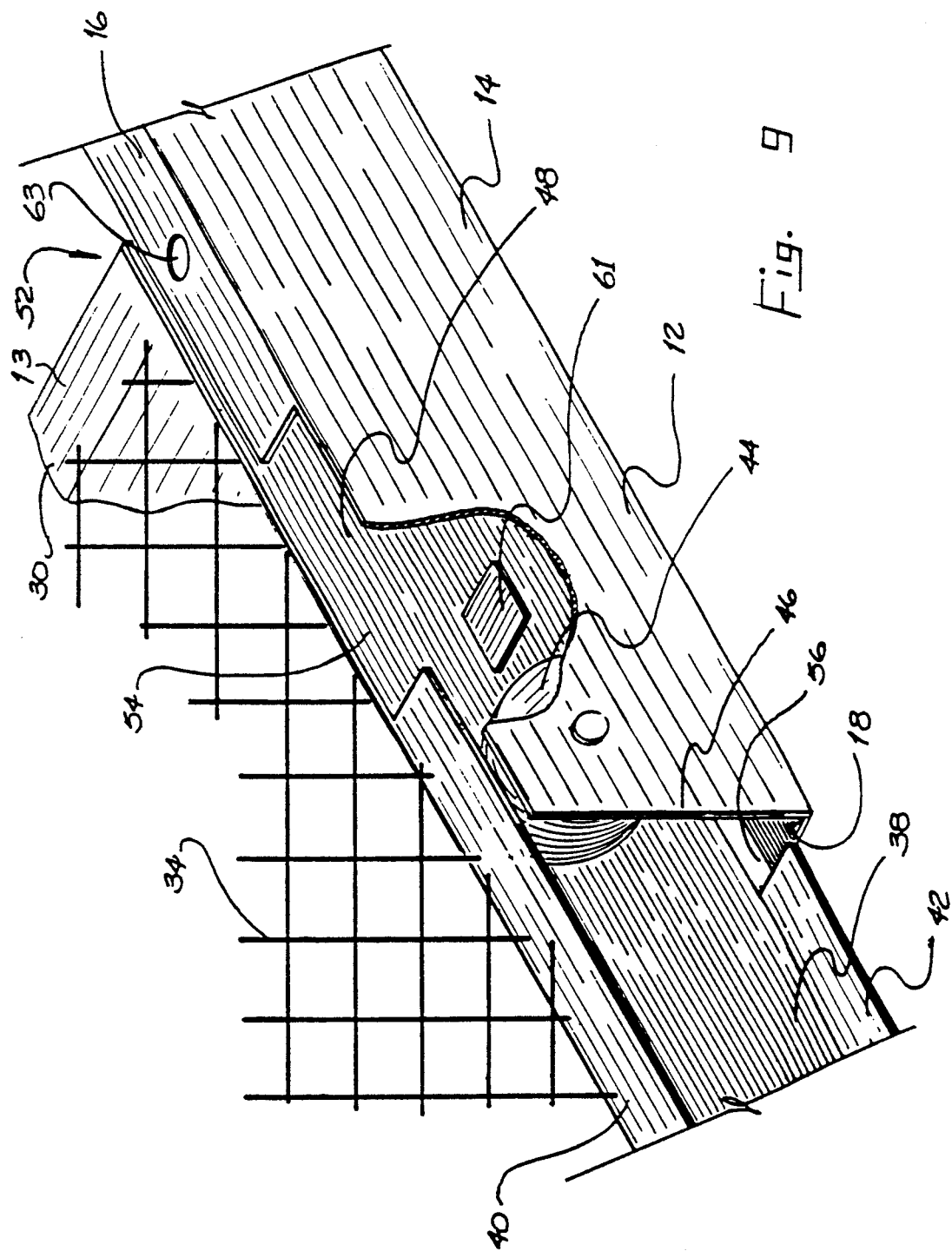
FIG. 9 is a detailed view of the platform of FIG. 3 and frame of FIG. 4 in an extended position as illustrated in FIG. 1.

The primary components of cargo handling apparatus 10 are a pair of elongate supports 12 and a rectangular platform 13. Referring to FIG. 5, supports 12 are constructed of channel iron "C" shaped in cross-section each of which has a side wall 14, an upper wall 16 and a lower wall 18. Three mounting plates 20 are transversely secured between supports 12, as illustrated in FIG. 4. Mounting plates 20 maintain supports 12 in parallel spaced relation with "C" channels facing inwardly. Mounting plates 20 have holes 22 through which bolts 24 (or other fastening devices) may be extended to secure supports 12 horizontally to a cargo box 26 of a delivery vehicle 28. Referring to FIG. 3, platform 13 consists of a plurality of transverse 30 and longitudinal 32 members to which is secured a wire mesh covering 34. Platform 13 has longitudinal edges 36 of channel iron "C" shaped in cross-section facing outwardly which engage the "C" channel supports 12, as illustrated in FIG. 6. The "C" channel on longitudinal edges 36 has a side wall 38, an upper wall 40 and a lower wall 42. Referring to FIG. 5, rollers 44 are rotatably secured to side wall 14 at a first end 46 of supports 12. First end 46 is the end of supports 12 which receive platform 13. Upper walls 16 adjacent rollers 44 having a space 48. Referring to FIG. 6, rollers 50 are rotatably secured to side wall 38 of the "C" channel along longitudinal edges 36 at a first end 52 of platform 13. First end 52 of platform 13 is the end which is received by supports 12. Upper walls 40 of the "C" channel along longitudinal edges 36 adjacent rollers 50 have a space 54. Lower end wall 42 of the "C" channel along longitudinal edges 36 of platform 13 has a space 56. A handle 58 is attached to a second end 60 of platform 13. Referring to FIG. 9, a tongue 61 extends substantially horizontally from side wall 38 of platform 13. Referring to FIGS. 8 and 9, upper wall 16 of supports 12, and upper wall 40 of edges 36 of platform 13 have a plurality of holes 63.

Figure 2:
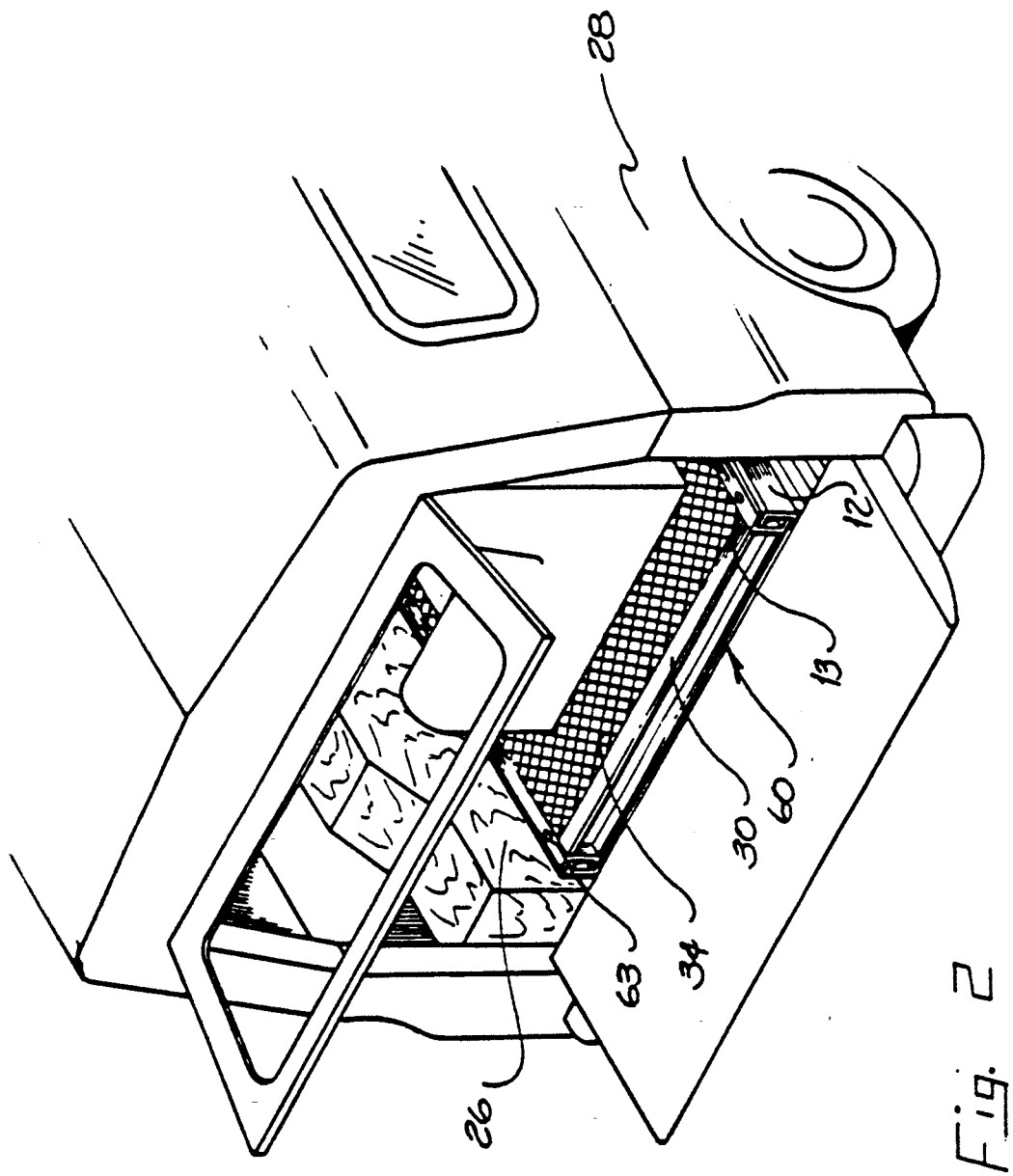
FIG. 2 is a perspective view of a preferred embodiment of the invention in a retracted position.

The use of cargo handling apparatus 10 will now be described with reference to FIGS. 1 through 9. In order to install cargo handling apparatus 10 supports 12 with attached mounting plates 20 are horizontally laid in cargo box 26 of delivery vehicle 28. Delivery vehicle 28 as illustrated in FIGS. 1 and 2, depicts a half ton truck with cargo box 26 enclosed by a low shell cover. Supports 12 are then secured to cargo box 26 by bolts 24 which are inserted through holes 22. Once supports 12 are secured to cargo box 26 platform 13 is engaged with supports 12 by inserting rollers 44 of supports 12 through space 56 of in lower end wall 42 of the "C" channel along longitudinal edges 36. Once platform 13 and supports 12 are engaged rollers 44 bear against upper walls 40 of the "C" channel along longitudinal edges 36 of platform 13 and rollers 50 bear against upper walls 16 of "C" channel supports 12. Platform 13 may be drawn from a retracted to an extended position by means of the handle 58. In the extended position second end 60 of platform 13 extends substantially from first end 46 of supports 12, as illustrated in FIG. 1. In the retracted position platform 13 is retracted within supports 12, as illustrated in FIG. 2. The movement of platform 13 in the extended position is limited by tongue 61 engaging the lower portion of rollers 44 on supports 12, as illustrated in FIG. 9. By raising the second end 60 of platform 13 rollers 44 of supports 12 pass under tongue 61 to permit disengagement of the platform 13 from the supports 12. Referring to FIG. 8, in order to prevent an unintended retraction of platform 13 when vehicle 28 in on an incline, holes 63 in platform 13 and supports 12 are aligned and a pin 64 inserted therethrough to lock platform 13 in a preselected position in relation to supports 12.

It is preferred to construct cargo handling apparatus out of channel iron to ensure that platform 13 and supports 12 can handle the stress placed upon them when platform 13 is drawn to an extended position fully loaded with cargo. It is preferred to construct platform using transverse 30 and longitudinal 32 members covered with wire mesh 34 in order to reduce the weight of platform 13. It is preferred to fasten mounting plates 20 using bolts 24 in order to ensure that mounting plates 20 do not separate from cargo box 26 when weight is placed upon supports 12 with platform 13 in an extended position. It is preferred to space holes 63 at one foot intervals, in order to provide a number of alternative positions for locking platform 13 in an extended position.

It will be apparent to one skilled in the art that through the use of cargo handling apparatus 10 a delivery man can avoid having to risk injury to himself by carrying cargo while bent over, or risk damage to the cargo by dragging it across the cargo box. It will also be apparent to one skilled in the art that modifications may be made to the preferred embodiment without departing from the spirit and scope of the invention. In particular, the engagement between the platform and the supports can be modified.

The embodiments of the invention in which an exclusive property or privilege is claimed are defined as follows:

1. An apparatus for handling cargo, comprising:
   a. a pair of elongate supports;
   b. means for securing the supports horizontally in parallel spaced relation to a cargo box of a delivery vehicle;
   c. a rectangular platform having longitudinal edges which engage the supports thereby coupling the platform to the supports such that the platform is movable between a position extending from the supports and a position retracted within the supports; and
   d. means for limiting the movement of the platform in the extended position thereby preventing the separation of the platform from the supports
   e. the supports being of channel iron "C" shaped in cross-section, and the edges of the platform being of channel iron "C" shaped in cross-section, the channel iron from which the supports and the edges of the platform is constructed having a side wall, an upper wall and a lower wall, the supports having a first end which telescopically receives the platform and a second end, rollers being rotatably secured to the side wall at the first end of the supports, the platform having a first end which is telescopically received in the supports and a second end, rollers being rotatably secured to the side wall at the first end of the platform, a space being provided in the upper walls of the edges of the platform adjacent the rollers such that the rollers bear against the upper walls of the supports, a space being provided in the upper walls of the supports adjacent the rollers such that the rollers bear against the upper walls of the edges of the platform, a space being provided in the lower end wall of the edges of the platform adjacent the rollers, whereby upon coupling the platform and the supports, the rollers of the supports may be inserted through the space in the lower wall.

2. An apparatus for handling cargo as defined in claim 1, the means for limiting the movement of the platform being a tongue extending substantially horizontally from the side wall of the platform adjacent the rollers such that upon movement of the platform to an extended position the tongue engages a lower portion of the rollers on the support, and upon raising the second end of the platform the rollers of the support pass over the tongue to permit disengagement of the platform from the supports.

3. An apparatus for handling cargo as defined in claim 1, having a handle attached to the second end of the platform such that the platform may be drawn from a retracted position to an extended position.

4. An apparatus for handling cargo as defined in claim 1, the upper wall of the supports, and the upper wall of the edges of the platform having a plurality of holes, whereby the holes in the platform and supports are aligned and a pin inserted therethrough to lock the platform in a preselected position in relation to the supports.

5. An apparatus for handling cargo, comprising:
   a. a pair of elongate supports, the supports being of channel iron "C" shaped in cross-section having a side wall, an upper wall and a lower wall, the supports having a first end and a second end, rollers being rotatably secured to the side wall at the first end of the supports, a space being provided in both the upper walls of the supports adjacent the rollers;
   b. mounting plates attached to the supports, the mounting plates having holes, whereby fasteners are extended through the holes to secure the supports horizontally in parallel spaced relation to a cargo box of a delivery vehicle;
   c. a rectangular platform having longitudinal edges of channel iron "C" shaped in cross-section having a side wall, an upper wall and a lower wall, the platform having a first end and a second end, the platform having of a plurality of transverse and longitudinal members to which is secured a wire mesh covering, rollers being rotatably secured to the side wall at the first end of the platform, a space being provided in the upper walls and the lower walls of the edges of the platform adjacent the rollers, whereby the platform is telescopically received in the first end of the supports by inserting the rollers of the supports through the space in the lower wall of the platform, the rollers on the platform bear against the upper walls of the supports and the rollers on the supports bear against the upper walls of the edges of the platform such that the platform is movable between a position extending from the supports and a position retracted within the supports;
   d. a tongue extends substantially horizontally from the side wall of the platform adjacent the rollers such that upon movement of the platform to an extended position, the tongue engages a lower portion of the rollers on the support thereby preventing separation of the platform from the supports, upon raising the second end of the platform, the rollers of the support pass over the tongue to permit disengagement of the platform from the supports;
   e. a handle attached to the second end of the platform such that the platform may be drawn from a retracted to an extended position; and
   f. the upper wall of the supports, and the upper wall of the edges of the platform having a plurality of holes, whereby the holes in the platform and supports are aligned and a pin is insertable therethrough to lock the platform in a preselected position in relation to the supports.

6. In combination:
   a. a vehicle having a cargo box;
   b. a pair of elongate supports, the supports being of channel iron "C" shaped in cross-section having a side wall, an upper wall and a lower wall, the supports having a first end and a second end, rollers being rotatably secured to the side wall at the first end of the supports, a space being provided in both the upper walls of the supports adjacent the rollers;
   c. mounting plates attached to the supports, the mounting plates having holes, whereby fasteners are extended through the holes to secure the supports horizontally in parallel spaced relation to the cargo box of the vehicle;
   d. a rectangular platform having longitudinal edges of channel iron "C" shaped in cross-section having a side wall, an upper wall and a lower wall, the platform having a first end and a second end, the platform having of a plurality of transverse and longitudinal members to which is secured a wire mesh covering, rollers being rotatably secured to the side wall at the first end of the platform, a space being provided in the upper walls and the lower walls of the edges of the platform adjacent the rollers, whereby the platform is telescopically received in the first end of the supports by inserting the rollers of the supports through the space in the lower wall of platform, the rollers on the platform bear against the upper walls of the supports and the rollers on the supports bear against the upper walls of the edges of the platform such that the platform is movable between a position extending from the supports and a position retracted within the supports;
   e. a tongue extends substantially horizontally from the side wall of the platform adjacent the rollers such that upon movement of the platform to an extended position the tongue engages a lower portion of the rollers on the support thereby preventing separation of the platform from the supports, upon raising the second end of the platform, the rollers of the support pass over the tongue to permit disengagement of the platform from the supports;
   f. a handle attached to the second end of the platform such that the platform may be drawn from a retracted position to an extended position; and
   g. the upper wall of the supports, and the upper wall of the edges of the platform having a plurality of holes, whereby the holes in the platform and supports are aligned and a pin is insertable therethrough to lock the platform in a preselected position in relation to the supports.

* * * * *